(12) United States Patent
Zheng et al.

(10) Patent No.: US 11,914,347 B2
(45) Date of Patent: Feb. 27, 2024

(54) CONFIGURABLE INDUSTRIAL PROTECTION SYSTEM

(71) Applicant: GE INFRASTRUCTURE TECHNOLOGY LLC, Greenville, SC (US)

(72) Inventors: Peigen Zheng, Shanghai (CN); Qiang Bai, Shanghai (CN); Lifeng Wang, Shanghai (CN); Qilin Xue, Shanghai (CN)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/591,009

(22) Filed: Feb. 2, 2022

(65) Prior Publication Data

US 2022/0260974 A1 Aug. 18, 2022

Related U.S. Application Data

(60) Provisional application No. 63/148,990, filed on Feb. 12, 2021.

(51) Int. Cl.
*G05B 19/418* (2006.01)
(52) U.S. Cl.
CPC ..... *G05B 19/4184* (2013.01); *G05B 19/4185* (2013.01); *G05B 19/41845* (2013.01)
(58) Field of Classification Search
CPC .......... G05B 19/4184; G05B 19/41845; G05B 19/4185; G05B 19/0428; G05B 9/03
See application file for complete search history.

(56) References Cited

U.S. PATENT DOCUMENTS

| | | | | |
|---|---|---|---|---|
| 9,362,913 | B1 * | 6/2016 | Schmit | H03K 19/00369 |
| 2007/0198106 | A1 * | 8/2007 | Schuster | G05B 9/03 700/79 |
| 2011/0313580 | A1 * | 12/2011 | Bakhmach | G05B 9/03 700/79 |
| 2017/0181315 | A1 * | 6/2017 | Gafni | H04L 49/15 |
| 2018/0190395 | A1 * | 7/2018 | Clarkson | G21C 9/02 |
| 2021/0116878 | A1 * | 4/2021 | Law | G05B 19/0428 |

* cited by examiner

*Primary Examiner* — Eric J Yoon
*Assistant Examiner* — Mohammed Shafayet
(74) *Attorney, Agent, or Firm* — Armstrong Teasdale LLP

(57) ABSTRACT

A method includes selecting one of a first safety architecture and a second safety architecture of a protection system configured to monitor a protection system. The protection system includes an input base, a controller base and an output base. The selecting includes selecting one of a first voting logic associated with the first safety architecture and a second voting logic associated with the second architecture. The controller base is configured to execute the selected voting logic. The method also includes configuring the protection system including a plurality of processing channels to operate in one of a first configuration associated with the first safety architecture and a second configuration associated with the second safety architecture. The configuring includes altering the number of processing channels releasably coupled to the protection system and hardware relay output in the protection system. Each processing channel of the plurality of processing channels includes an input circuit coupled to the input base, a controller coupled to the controller base and an output circuit coupled to the output base.

15 Claims, 8 Drawing Sheets

400

402 — SELECTING ONE OF A FIRST SAFETY INTEGRITY LEVEL AND A SECOND SAFETY INTEGRITY LEVEL OF A PROTECTION SYSTEM CONFIGURED TO MONITOR AN INSPECTION SYSTEM, THE PROTECTION SYSTEM INCLUDING AN INPUT BASE, A CONTROLLER BASE AND AN OUTPUT BASE, WHEREIN THE SELECTING INCLUDES SELECTING ONE OF A FIRST VOTING LOGIC ASSOCIATED WITH THE FIRST SAFETY INTEGRITY LEVEL AND A SECOND VOTING LOGIC ASSOCIATED WITH THE SECOND INTEGRITY LEVEL, THE CONTROLLER BASE CONFIGURED TO EXECUTE THE SELECTED VOTING LOGIC

404 — CONFIGURING THE INSPECTION SYSTEM INCLUDING A PLURALITY OF PROTECTION CHANNELS TO OPERATE IN ONE OF A FIRST CONFIGURATION ASSOCIATED WITH THE FIRST SAFETY INTEGRITY LEVEL AND A SECOND CONFIGURATION ASSOCIATED WITH THE SECOND SAFETY INTEGRITY LEVEL, THE CONFIGURING INCLUDES ALTERING THE NUMBER OF PROTECTION CHANNELS RELEASABLY COUPLED TO THE PROTECTION SYSTEM, WHEREIN EACH PROTECTION CHANNEL OF THE PLURALITY OF PROTECTION CHANNELS INCLUDES AN INPUT CIRCUIT COUPLED TO THE INPUT BASE, A CONTROLLER COUPLED TO THE CONTROLLER BASE AND AN OUTPUT CIRCUIT COUPLED TO THE OUTPUT BASE.

FIG. 4

CONFIGURABLE INDUSTRIAL PROTECTION SYSTEM

RELATED APPLICATION

This application claims priority under 35 U.S.C. § 119(e) to U.S. Provisional Patent Application No. 63/148,990 filed on Feb. 12, 2021, the entire content of which is hereby expressly incorporated by reference herein.

BACKGROUND

A safety instrumented system (SIS) can include hardware and software controls to protect industrial systems. For example, industrial systems executing critical process ("critical process systems") may need to be operated in a safe state (e.g. shut down state) in order to avoid hazardous safety, health and environmental concerns. Performance of SIS can be based on Safety Integrity Level (SIL) that can be associated with a given risk level of the industrial system being monitored by SIS. SIL can depend on, for example, type of devices (e.g., sensor, valves, etc.), hardware architecture (e.g., level of redundancy), voting logic (e.g., how an action is initiated based on conflicting signals) of the SIS.

SUMMARY

Various aspects of the disclosed subject matter may provide one or more of the following capabilities.

A method includes selecting one of a first safety architecture and a second safety architecture of a protection system configured to monitor a protection system. The protection system includes an input base, a controller base and an output base. The selecting includes selecting one of a first voting logic associated with the first safety architecture and a second voting logic associated with the second architecture. The controller base is configured to execute the selected voting logic. The method also includes configuring the protection system including a plurality of processing channels to operate in one of a first configuration associated with the first safety architecture and a second configuration associated with the second safety architecture. The configuring includes altering the number of processing channels releasably coupled to the protection system. Each processing channel of the plurality of processing channels includes an input circuit coupled to the input base, a controller coupled to the controller base and an output circuit coupled to the output base.

One or more of the following features can be included in any feasible combination.

In some implementations, selecting one of the first safety architecture and the second safety architecture further includes providing, in a graphical user interface display space, a first interactive graphical object indicative of the first safety architecture and a second interactive graphical object indicative of the second safety architecture; and receiving a user input representative of selection of one of the first interactive graphical object and the second interactive graphical object. In some implementations, the method further includes receiving by a voting circuit in the output base a plurality of control signals from a plurality of relay drivers, wherein each relay driver of the plurality of relay drivers is included in a unique processing channel of the plurality of processing channels.

In some implementations, the plurality of processing channels includes a first processing channel, a second processing channel and a third processing channel. Configuring the protection system to operate in the first configuration includes decoupling the third processing channel from the protection system. In some implementations, configuring the protection system to operate in the first configuration further includes inserting a choke at each of one or more locations in the voting circuit associated with the third processing channel.

In some implementations, the method further includes selecting the first voting logic and receiving, by each of a first controller in the first processing channel and a second controller in the second processing channel, a first input signal and a second input signal. The first and the second input signals are generated by a first input circuit in the first processing channel and a second input circuit in the second processing channel, respectively. The method also includes executing the first voting logic by the first controller and the second controller, the executing includes calculating a mean value of the first input signal and the second input signal.

In some implementations, the plurality of processing channels includes a first processing channel and a second processing channel. Configuring the protection system to operate in the second configuration includes adding a third processing channel to the protection system. In some implementations, the method further includes selecting the second voting logic and receiving, by each of a first controller in the first processing channel, a second controller in the second processing channel and a third controller in the third processing channel, a first input signal, a second input signal and a third input signal. The first, the second and the third input signals are generated by a first input circuit in the first processing channel, a second input circuit in the second processing channel, and a third input circuit in the third processing channel respectively. The method also includes executing the first voting logic by the first controller and the second controller, the executing includes calculating a median value of the first input signal, the second input signal, and the third input signal.

In some implementations, a protection system includes an input base comprising a plurality of input circuits, and a controller base comprising a plurality of controller, wherein each controller is configured to execute one of a first voting logic associated with a first safety architecture of the protection system and a second voting logic associated with a second architecture of the protection system. The protection system also includes an output base including a plurality of output circuits. The input base, the controller base and the output base include a plurality of processing channels releasably coupled to the protection system. Each processing channel of the plurality of processing channels includes an input circuit coupled to the input base, a controller coupled to the controller base and an output circuit coupled to the output base. The protection system is configured to allow a user to select one of the first safety architecture and a second safety architecture based on selection of the first voting logic and the second voting logic, the controller base configured to execute the selected voting logic based on the selection.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which:

FIG. 4 is a flow chart of an exemplary method for configuring the safety architecture of a protection system;

DETAILED DESCRIPTION

Safety Instrumentation systems (or protection systems) can reduce (or prevent) occurrence of accidents in industrial system that may result in hazardous safety, health and environmental conditions. The protection systems can be configured to implement a Safety Integrity Level (SIL) associated with a risk tolerance of the industrial system being monitored by the protection system. For example, a high value of SIL can in be indicative of a higher risk-tolerance, while a low value of SIL can be indicative of relatively lower risk-tolerance. SIL of the protection system can be based on both the hardware of the protection system and the software executed thereon. Existing protection systems are inflexible and can implement only one value of SIL. For example, a protection system configured to operate with a first SIL value (e.g., SIL 2) may not operate with a second SIL value (e.g., SIL 3), or vice versa. As a result multiple protection systems may be needed if multiple SILs need to be implemented. This can be expensive and inefficient. Some implementations of protection systems described herein are flexible, and can be configured to operate in multiple SILs (e.g., SIL 2 and SIL 3).

A protection system configured to operate in SIL 3 can include three processing channels (or have triple modular redundancy (TMR) or "TMR architecture") that can independently make a determination of a state of the industrial system. A protection system configured to operate in SIL 2 can include two processing channels (or have dual modular redundancy (DMR) or "DMR architecture") that can independently make a determination of the state of the industrial system. The operation of a protection system can be altered from a first SIL to a second SIL by altering the hardware of the protection system (e.g., by changing the number of processing channels, adding/removing a choke to/from the voting circuitry, etc.) and altering the voting logic associated with the hardware.

The various processing channels can be installed on a common base board that can include an input base, a controller base and an output base. Each processing channel can independently make a determination of the state of the industrial system. A measurement from a sensor in the industrial system can be fanned to input circuits of the three processing channels that can process the sensor measurement data and generate input signals. The input signal from each of the input circuit can be received by the controller in each of the processing channel (e.g., all controllers in all processing channels). Each controller can employ a voting logic on the received input signal to determine whether a trip signal should be generated. The trip signal from each controller can be received by a corresponding output circuit in the output base. The output base can vote on the trip signals to generate a digital output command. The digital output command can vary the operation of the industrial system.

Figure 1:
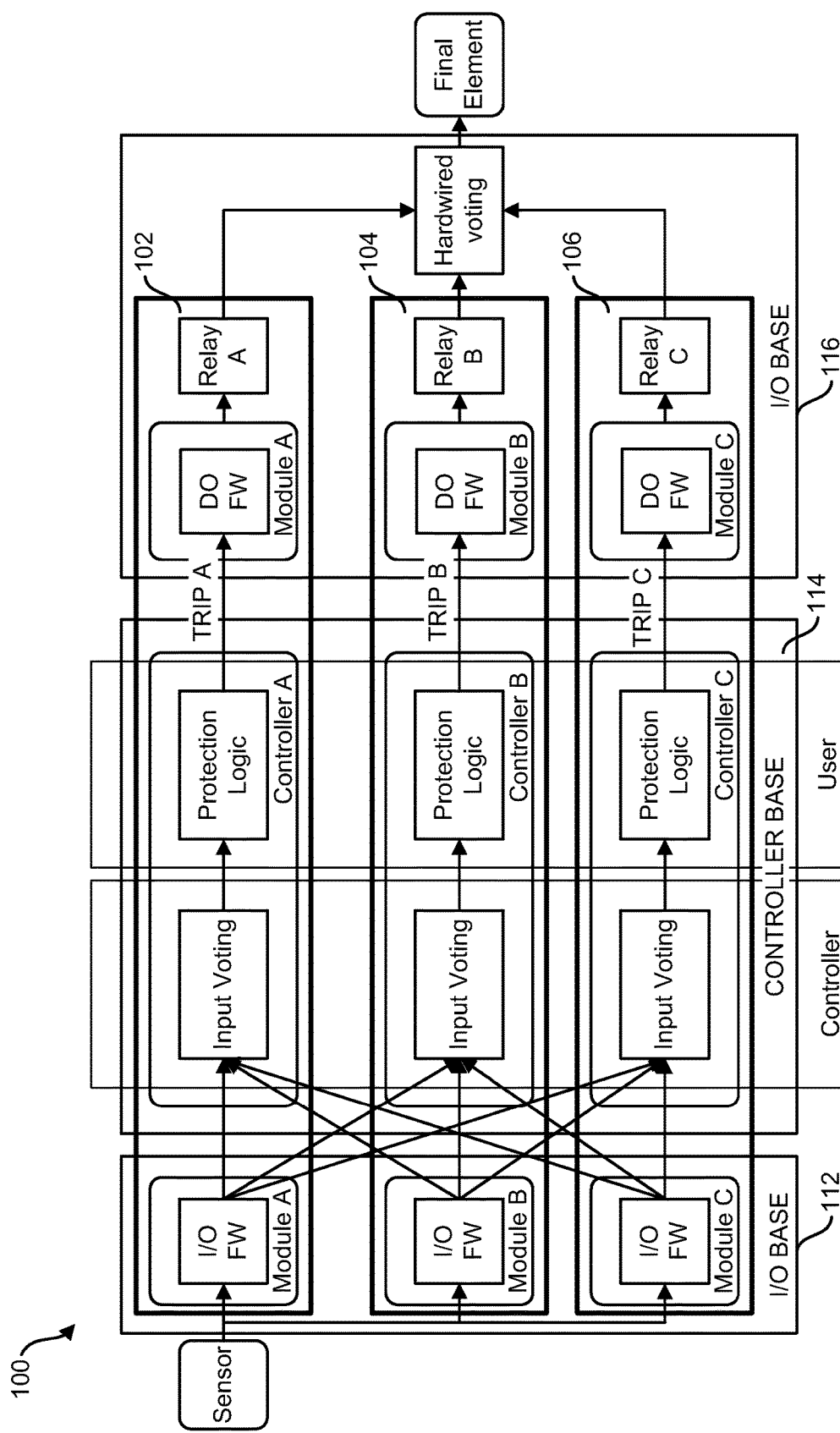
FIG. 1 illustrates an exemplary protection system in a triple modular redundancy architecture.

FIG. 1 illustrates an exemplary protection system 100 having three processing channels 102, 104 and 106 (or having TMR architecture). The protection system 100 can include an input base 112, a controller base 114 and an output base 116. In some implementations, the protection system 100 can include input/output bases. Each processing channel includes an input circuit releasably coupled to the input base 112, a controller releasably coupled to the controller base 114 and an output circuit releasably coupled to the output base 116. The input circuit of each processing channel can receive a sensor input (e.g., from a sensor configured to detect operating parameters of the industrial system) and calculate an input signal. The input signals generated by the various input circuits may be different (e.g., due to error in computation, difference in methodology in calculating the input signal, etc.). The controller in each processing channel can receive the input signal generated by input circuits in the processing channels 102, 104 and 106 (e.g., controller in processing channel 102 can receive an input signals from the input circuits in the processing channel 102, 104 and 106).

Figure 2:
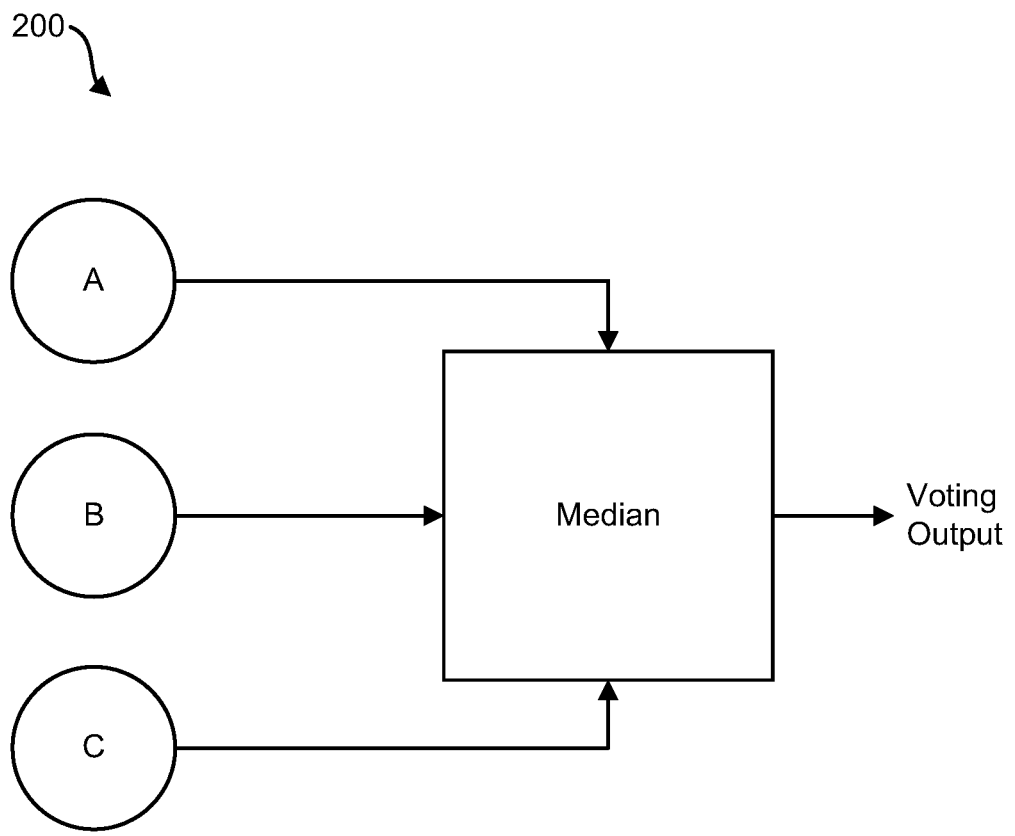
FIG. 2 illustrates an exemplary voting logic executed by the protection system in FIG. 1.

The controller in each processing channel (e.g., controller A, controller B, controller C, etc.) can execute a voting logic that can receive the input signals (e.g., from the input circuits of the processing channels 102-106) and generate a voting output signal. As described later, the voting logic can be selected by a controller based on an input (e.g., selection of TMR/DMR) by a user (e.g., via a graphical user interface display space). FIG. 2 illustrates an exemplary median voting logic for the protection system 100. The voting logic can receive digital inputs (e.g., that can be 2oo3 voted). The median voting logic can receive input signals A, B and C from the input circuits in the processing channels 102, 104, 106, respectively, and calculate a median value of the input signals A, B, and C. The controller in each processing channel can further include a protection logic that can receive the voting output signal and generate a trip signal (e.g., trip signal A, trip signal B, trip signal C, etc.). For example, the trip signal can be generated when the voting output signal satisfies predetermined requirements (e.g., when the median of the input signals A, B and C has one or more predetermined characteristics).

Figure 3:
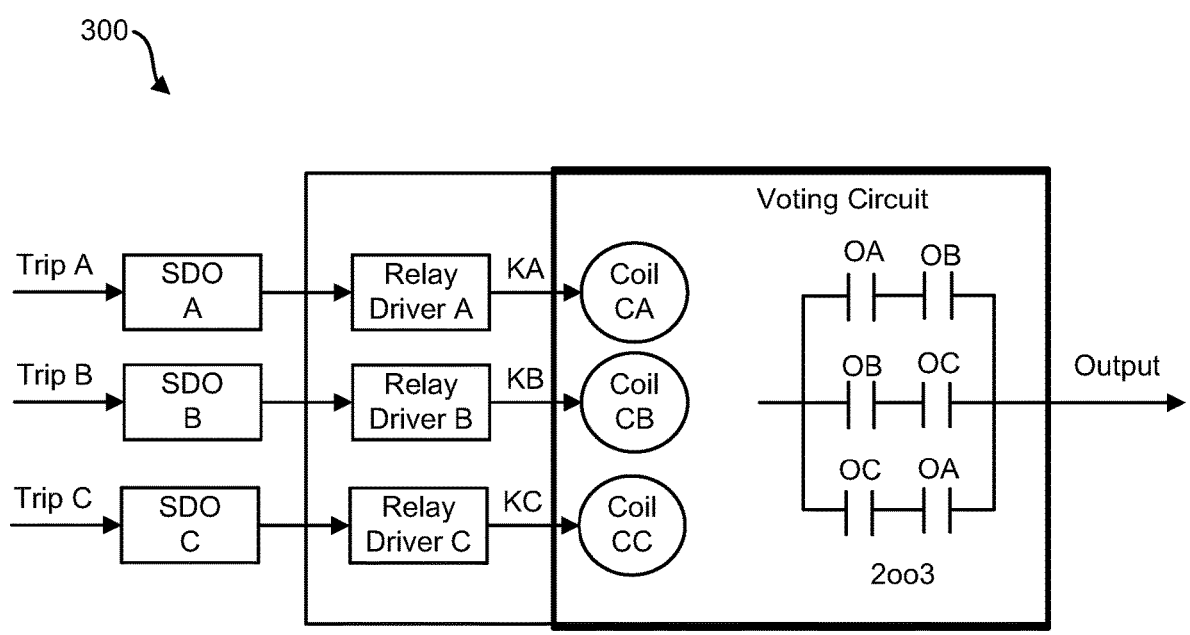
FIG. 3 illustrates an exemplary output base of the protection system in FIG. 1.

FIG. 3 illustrates an exemplary output base 300 of the protection system 100 that includes multiple output circuits and relay drivers, and a voting circuit. Each processing channel can include an output circuit that can receive the trip signal generated by the protection logic in the controller of that channel. For example, in processing channel 102, output circuit SDO A can receive trip signal A from the processing logic in controller A; in processing channel 104, output circuit SDO B can receive trip signal B from the processing logic in controller B; and in processing channel 106, output circuit SDO C can receive trip signal C from the processing logic in controller C. In each channel, upon receiving the trip signal, the output circuit can instruct the relay circuit to generate a control signal. For example, SDO A can instruct relay circuit A to generate control signal KA; SDO B can instruct relay circuit B to generate control signal KB; and SDO C can instruct relay circuit C to generate control signal KC.

The voting circuit in the output base can receive a plurality of control signals from a plurality of relay drivers in the various processing channels (e.g., control signals KA, KB and KC from relay drivers A, B and C, respectively) and generate an output signal. The output signal can be configured to alter the operation of the industrial system (e.g., to protect the industrial system and/or prevent occurrence of industrial system accidents). The voting circuit can include a "2oo3" architecture that can generate the output signal when at least two of the control signals KA, KB and KC are received. In some implementations, the voting circuit can include multiple coils (e.g., coils CA, CB, CC etc.) that can be excited based on the reception of the control signal. In some implementations, a given coil (e.g., CA, CB, CC, etc.) can be electrically coupled to multiple contact outputs that can be rendered conductive when the given coil is excited. For example, coil CA can be excited by control signal KA; coil CB can be excited by control signal KB; and coil CC can be excited by control signal KA. When the coil CA is excited, the corresponding contact outputs OA in the top and bottom row can be rendered conductive, when the coil CB is excited, the corresponding contact outputs OB in the top and middle row can be rendered conductive; and when the coil CC is excited, the corresponding contact outputs OC in the middle and bottom row can be rendered conductive.

If coils CA, CB and CC are excited, the contact outputs in all the rows of the voting circuit (e.g., OA, OB, and OC) can be conductive; if only coils CA and CB are excited, the contact outputs (e.g., OA and OB) in only the top row is conductive; if only coils CB and CC are excited, the contact outputs (e.g., OB and OC) in only the middle row is conductive; if only coils CA and CC are excited, the contact outputs (e.g., OA and OC) in only the bottom row is conductive; if only one of the coils CA, CB and CC are excited, none of the rows are conductive. As long as one of the three rows are conductive, the voting circuit can transmit the output signal.

FIG. 4 is a flow chart of an exemplary method for configuring the safety architecture of a protection system (e.g., configuring the protection system 100 having TMR architecture being altered to DMR architecture or vice-versa). At step 402, one of a first safety architecture and a second safety architecture of a protection system configured to monitor a protection system is selected (e.g., by a user). This can be done, for example, by providing (e.g. by a computing device communicatively coupled to the control base 114), in a graphical user interface display space, a first interactive graphical object indicative of the first safety architecture and a second interactive graphical object indicative of the second safety architecture. The user can select one of the first and the second graphical object.

Figure 5:
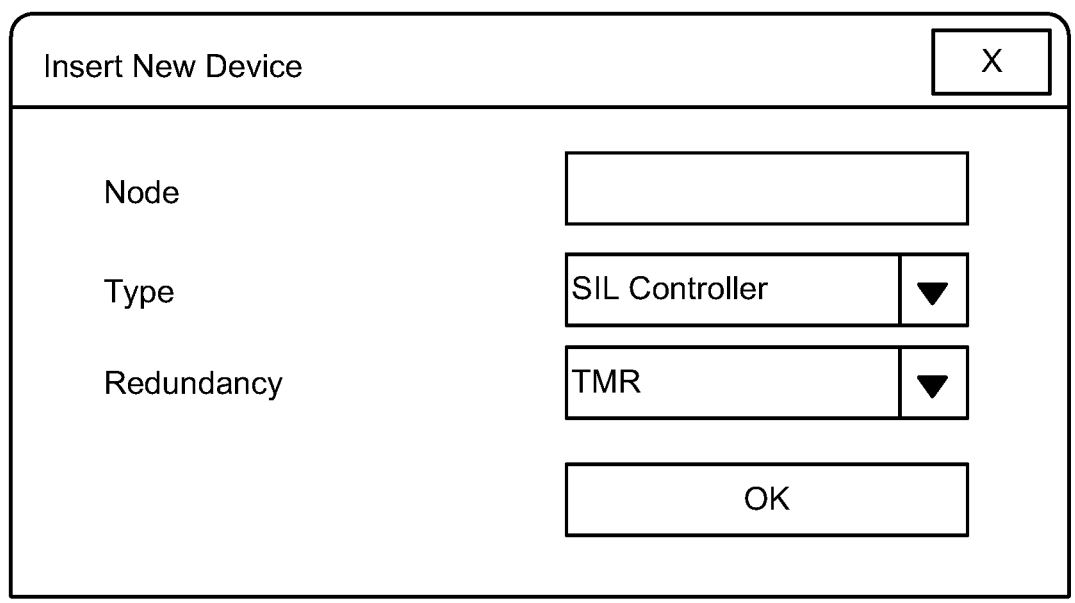
FIG. 5 illustrates an exemplary interactive graphical object configured to allow for selection of an architecture/redundancy of a protection system.

FIG. 5 illustrates an exemplary GUI display space 500 that can allow for selection of the first safety architecture (e.g., by selecting an interactive graphical object labelled "TMR" (or "DMR")) or a second safety architecture (e.g., by selecting an interactive graphical object labelled "DMR" (or "TMR")) different from the first architecture. A user input representative of selection of one of the first interactive graphical object and the second interactive graphical object can be received (e.g., by the computing device). Based on the user input, a corresponding voting logic can be executed by the controllers in the control base 114. For example, if the user selects the TMR architecture, the controllers can execute the median voter logic (e.g., as illustrated in FIG. 2). Alternately, if the user selects the "DMR" architecture, the controller can execute a mean voter logic (e.g., as illustrated in FIG. 7).

Figure 6:
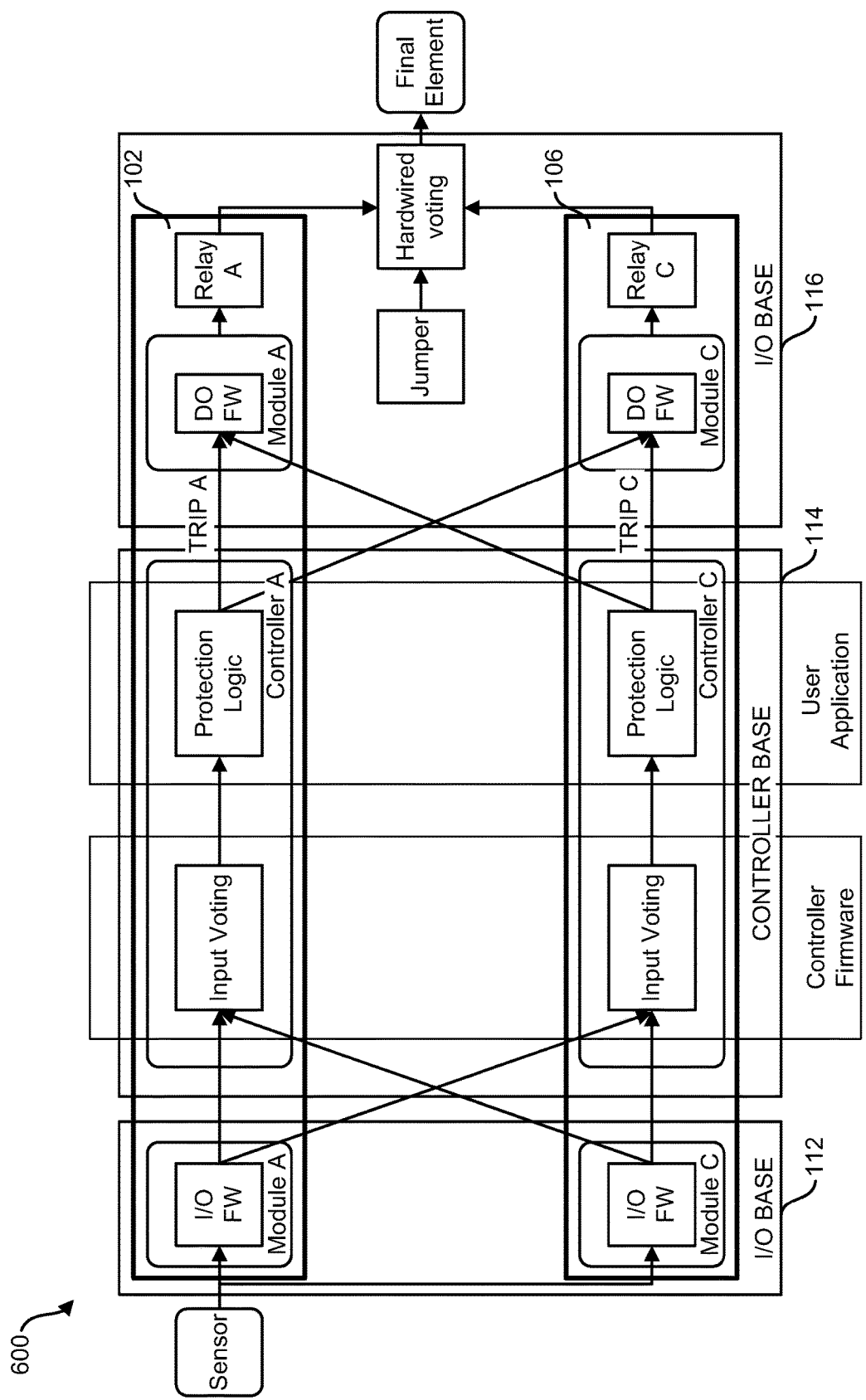
FIG. 6 illustrates an exemplary protection system in dual modular redundancy architecture obtained by decoupling a processing channel of the protection system in FIG. 1.

At step 404, a protection system can be configured to operate in one of a first configuration associated with the first safety architecture (e.g., "TMR" or "DMR") and a second configuration associated with the second safety architecture (e.g., "DMR" or "TMR"). The configuring can include altering the number of processing channels releasably coupled to the protection system. In some implementations, the protection system 100, operating with TMR and having three processing channels 102, 104 and 106, can be configured to operate with DMR architecture associated with SIL 2. This can be achieved by decoupling the processing channel 104 from the protection system 100. FIG. 6 illustrates an exemplary protection system 600 characterized by DMR architecture that can be obtained by decoupling the processing channel 104 (e.g., by decoupling input circuit from the input base 112, decoupling controller B from controller base 114, and decoupling output circuit SDO B and relay driver B from the output base 116) from the protection system 100 (characterized by TMR architecture). Additionally, the voting circuit in the output base 116 can be modified by replacing Relay B) with a jumper/choke 602. This can render the contact outputs OB associated with CB in the top and middle row conductive. The jumper 602 can be a conductor and can mimic Relay Bin the excited state (e.g., mimic reception of the control signal KB).

Figure 7:
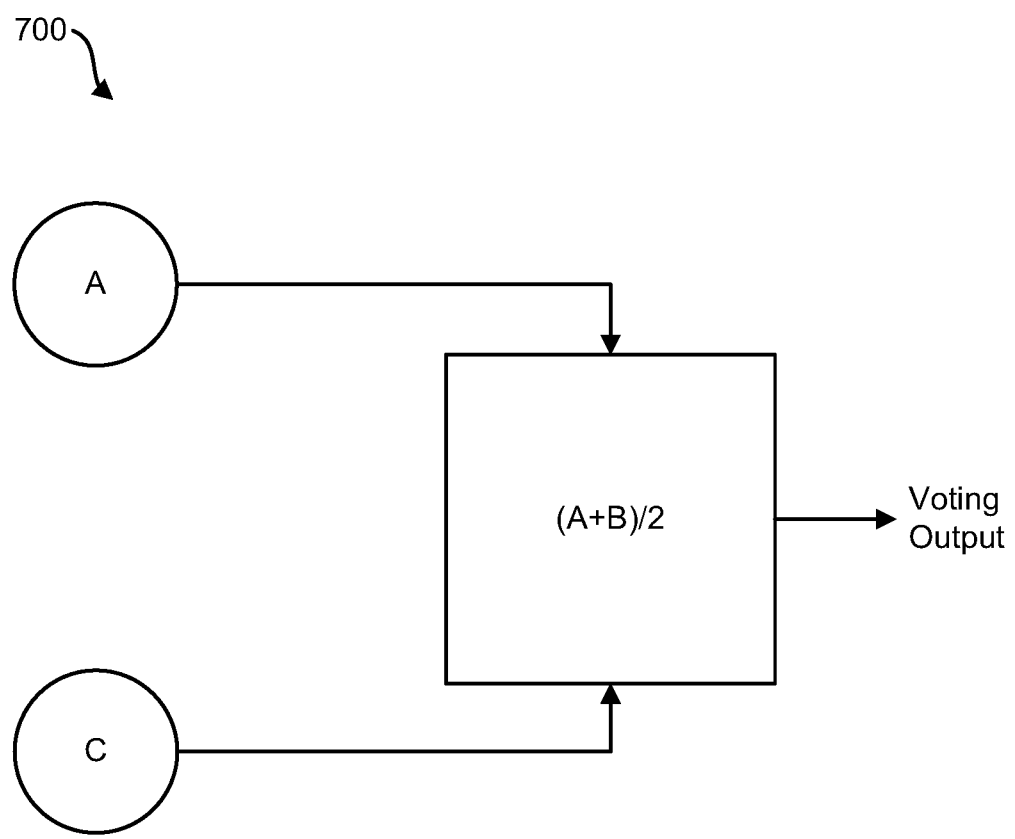
FIG. 7 illustrates an exemplary voting logic for the protection system in FIG. 6.

FIG. 7 illustrates an exemplary mean voting logic for the protection system 600. The mean voting logic can be configured/selected by a user at step 402 via selection of the interactive graphical object labelled "DMR" in the GUI display space 500. The mean voting logic can receive input signals A and C from the input circuits in the processing channels 102 and 106, respectively, and can generate a voting output signal that includes a mean value of the input signals A and C. The protection logic in controller A and controller C can receive the voting output signal and generate a trip signal (e.g., trip signal A and trip signal C). For example, the trip signal can be generated when the voting output signal satisfies predetermined requirements (e.g., when the mean of the input signals A and C has one or more predetermined characteristics).

Figure 8:
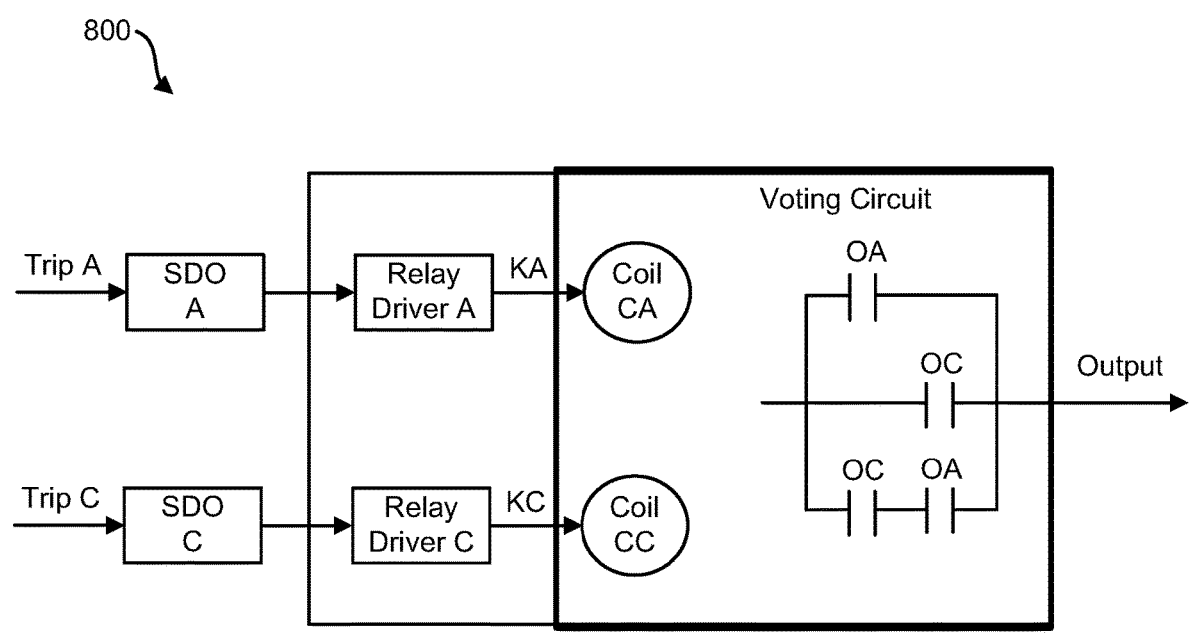
FIG. 8 illustrates an exemplary output base of the protection system in FIG. 6.

FIG. 8 illustrates an exemplary output base 800 of the protection system 600. The output base 800 includes output circuits and relay drivers associated with the processing channels 102 and 106. The output base 800 can be obtained by modifying the output base 300 that includes removing the output circuit SDO B and relay driver B of the processing channel 104, and replacing coils CB and the associated contact outputs in the top and middle rows of the voting circuits with jumper/choke. The voting circuit in this configuration transmits the output signal when one or both of the coils CA and CC are excited. By selecting "DMR" in the GUI display space 500, by removing processing channel 104, and by making the aforementioned changes to the output base, DMR architecture (associated with SIL 2) can be implemented on the protection system 100 configured to operate with TMR architecture. In some implementations, TMR architecture (associated with SIL 3) can be implemented on the protection system 600 configured to operate with DMR architecture. This can be done by removing the jumper/choke 602, adding the processing channel 104 to the protection system 600 (e.g., such that the jumper/choke 602 is replaced by relay B of the protection channel 104), and by selecting "TMR" in the GUI display space 500. Based on the selection of "TMR," median voting logic can be executed by controllers A, B and C.

Other embodiments are within the scope and spirit of the disclosed subject matter. For example, the prioritization method described in this application can be used in facilities that have complex machines with multiple operational parameters that need to be altered to change the performance of the machines. Usage of the word "optimize"/"optimizing" in this application can imply "improve"/"improving."

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving a selection of a first safety architecture of a protection system configured to transition between the first safety architecture and a second safety architecture of the protection system configured to monitor an industrial system, the protection system comprising an input base, a controller base, and an output base, the input base being non coupled to the controller base, the input base, the controller base, and the output base comprising a plurality of processing channels, the controller base being configured to execute a voting logic, wherein each processing channel of the plurality of processing channels independently makes a determination of a state of the industrial system and comprises an input circuit coupled to the input base, a controller coupled to the controller base, and an output circuit coupled to the output base;
   altering, based on the selection, a number of processing channels of the plurality of processing channels of the protection system to operate in a first configuration associated with the first safety architecture, wherein the plurality of processing channels releasably coupled to the protection system to vary an operation of the industrial system, wherein the number of processing channels is different between the first configuration for the first safety architecture and a second configuration for the second safety architecture; and
   determining, based on the selection, the voting logic comprising a first voting logic associated with the first safety architecture.

2. The method of claim 1, further comprising:
   providing, in a graphical user interface display space, a first interactive graphical object indicative of the first safety architecture and a second interactive graphical object indicative of the second safety architecture; and
   receiving a user input representative of selection of one of the first interactive graphical object and the second interactive graphical object.

3. The method of claim 2, further comprising receiving by a voting circuit in the output base a plurality of control signals from a plurality of relay drivers, wherein each relay driver of the plurality of relay drivers is included in a unique processing channel of the plurality of processing channels.

4. The method of claim 2, wherein the plurality of processing channels comprises a first processing channel, a second processing channel, and a third processing channel, and wherein the first configuration comprises decoupling the third processing channel from the protection system.

5. The method of claim 4, wherein the first configuration further comprises inserting a choke at each of one or more locations in a voting circuit associated with the third processing channel.

6. The method of claim 1, further comprises:
   selecting the first voting logic;
   receiving, by each of a first controller in a first processing channel and a second controller in a second processing channel, a first input signal and a second input signal, wherein the first input signal is generated by a first input circuit in the first processing channel and the second input signal is generated by a second input circuit in the second processing channel; and
   executing the first voting logic by the first controller and the second controller, the executing comprises calculating a mean value of the first input signal and the second input signal.

7. The method of claim 2, wherein the plurality of processing channels comprises a first processing channel and a second processing channel, and
   wherein the second configuration comprises adding a third processing channel to the protection system.

8. The method of claim 7, further comprises:
   selecting the second configuration associated with the second safety architecture, wherein the second configuration is associated with a second voting logic;
   receiving, by each of a first controller in the first processing channel, a second controller in the second processing channel and a third controller in the third processing channel, a first input signal, a second input signal and a third input signal, wherein the first input signal is generated by a first input circuit in the first processing channel, the second input signal is generated by a second input circuit in the second processing channel, and the third input signal is generated by a third input circuit in the third processing channel respectively; and
   executing the second voting logic by the first controller, the second controller, and the third controller, the executing comprises calculating a median value of the first input signal, the second input signal, and the third input signal.

9. The method of claim 1, further comprises:
   receiving a second selection of the second safety architecture of the protection system;
   altering, based on the second selection, a number of processing channels of the plurality of processing channels of the protection system to operate in the second configuration associated with the second safety architecture; and
   determining, based on the second selection, the voting logic comprising one of a second voting logic associated with the second safety architecture.

10. The method of claim 1, wherein the first configuration includes two processing channels, and wherein the second configuration includes three processing channels.

11. A protection system comprising:
an input base comprising a plurality of input circuits;
a controller base comprising a plurality of controllers, wherein each controller of the plurality of controllers is configured to execute one of a first voting logic associated with a first safety architecture of the protection system and a second voting logic associated with a second safety architecture of the protection system, the input base being coupled to the controller base; and
an output base comprising a plurality of output circuits,
wherein the input base, the controller base and the output base comprise a plurality of processing channels releasably coupled to the protection system, wherein each processing channel of the plurality of processing channels comprises an input circuit coupled to the input base, a controller coupled to the controller base and an output circuit coupled to the output base, and wherein the protection system is configured to:
receive a selection of the first safety architecture based on selection of the first voting logic;
alter, based on the received selection, a number of processing channels of the plurality of processing channels of the protection system to operate in a first configuration associated with the first safety architecture, wherein the number of processing channels is different between the first configuration for the first safety architecture and a second configuration for the second safety architecture; and
operate in the first configuration associated with the first safety architecture.

12. The protection system of claim 11, further comprising:
a graphical user interface configured to provide in display space, a first interactive graphical object indicative of the first safety architecture and a second interactive graphical object indicative of the second safety architecture and to receive a user input representative of selection of one of the first interactive graphical object and the second interactive graphical object.

13. The protection system of claim 12, wherein the output base comprises a voting circuit configured to receive a plurality of control signals from a plurality of relay drivers, wherein each relay driver of the plurality of relay drivers is included in a unique processing channel of the plurality of processing channels.

14. The protection system of claim 13, wherein the plurality of processing channels comprises a first processing channel, a second processing channel and a third processing channel, and
wherein the operation of the protection system in the first configuration comprises decoupling the third processing channel from the protection system.

15. The protection system of claim 14, wherein the protection system is configured to operate in the first configuration based on insertion of a choke at each of one or more locations in the voting circuit associated with the third processing channel.

* * * * *